May 16, 1950     S. W. HERWALD     2,508,162
ELECTRIC MOTOR CONTROL SYSTEM
Filed April 30, 1945
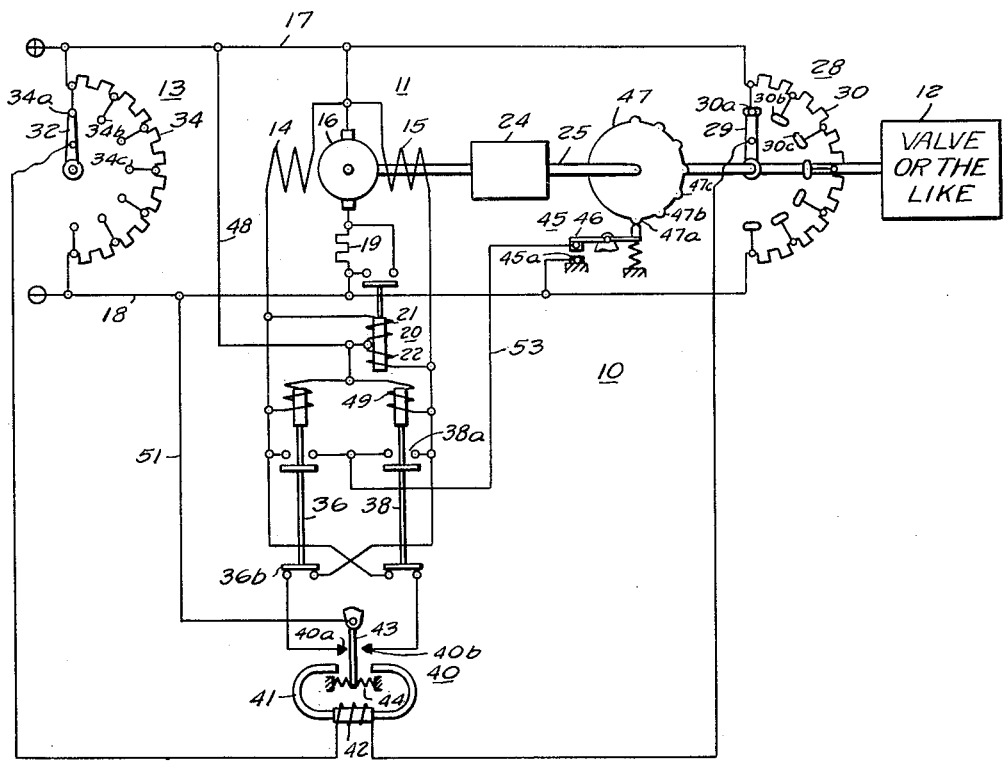
WITNESSES:
INVENTOR
Seymour W. Herwald.
BY
ATTORNEY Patented May 16, 1950

2,508,162

UNITED STATES PATENT OFFICE 2,508,162

ELECTRIC MOTOR CONTROL SYSTEM

Seymour W. Herwald, Pittsburgh, Pa., assignor to Westinghouse Electric Corporation, East Pittsburgh, Pa., a corporation of Pennsylvania Application April 30, 1945, Serial No. 591,075

2 Claims. (Cl. 318—29)

My invention relates, generally, to control systems and has reference, in particular, to remote control systems.

Generally stated, it is an object of my invention to provide a remote position-controlling system that is simple and inexpensive to manufacture and is easy to operate.

More specifically, it is an object of my invention to provide a remote control system for positioning a valve or the like in any of a finite number of different positions from a remote location.

It is also an important object of my invention to provide for selectively determining the direction of operation of a valve-operating motor required to move the valve to a desired position, and for maintaining an operating circuit for the motor through one or the other of alternate circuits until the valve reaches said position.

Another object of my invention is to provide for separately determining the direction of operation of a positioning motor of a movable element and the duration of the operating interval necessary to operate a movable element from one position to another predetermined position.

Yet another object of my invention is to provide for operating a valve or the like to any one of a finite number of different operating positions in response to definite increments of voltage in accordance with the distance position of the valve from the desired position.

Still another object of my invention is to provide for accurately positioning a movable element from a remote control or operating location in response to definite control voltage increments proportional to the distance of the movable element from a desired operating position, by providing one operating circuit for the positioning motor between each of a finite number of predetermined operating positions and another operating circuit in each of said positions so long as the element is remote from the desired position.

Other objects will, in part, be obvious and will, in part, be explained hereinafter.

In practicing my invention in one form thereof, a directional relay is connected between the movable contact members of a manual position selecting voltage divider, and a position-indicating voltage divider which is operatively connected to a valve that is to be remotely operated to any one of a finite number of predetermined positions for operation in each of the positions in response to a differential voltage which may exist between the moving contacts of the dividers, dependent on the valve being removed from the desired position. Each of the voltage dividers has a finite number of steps of resistance corresponding to the number of valve positions. Control relays operable under the control of the directional relay provide an operating circuit to determine the direction of operation of the valve motor as it reaches each of its operating positions. Switch means interrupt the control circuit each time the valve reaches one of the operating positions, thus insuring positive interruption of the control circuit at the desired operating position.

For a more complete understanding of the nature and scope of my invention, reference may be made to the following detailed description which may be studied in connection with the accompanying drawing in which the single figure is a diagrammatic view of a remote control system embodying the invention in one of its forms.

Referring to the drawing, the reference numeral 10 may denote, generally, a remote control system wherein a motor 11 is utilized to operate a movable element such as a valve, which may be represented by the enclosure 12, to any one of a finite number of operating positions under the control of a remote control device 13.

The motor 11 may be of any suitable type comprising, for example, a direct-current motor having oppositely related field windings 14 and 15 for operating the motor in opposite directions, and an armature 16. The armature may be energized from a suitable source of direct current represented by the conductors 17 and 18 through a current limiting resistor 19. A switch 20 having operating windings 21 and 22 connected across the field windings 14 and 15 of the motor, respectively, may be provided for shunting the resistor 19 whenever one of the field windings is energized. If desired, the resistor 19 may be used alone, or the switch 20 may be used without the resistor for energizing the armature 16 only when one or the other of the field windings 14 and 15 is energized. The motor may be operatively connected to the valve 12 in any suitable manner, such as by means of a gear drive designated by the enclosure 24, and a shaft 25.

In order to determine the direction of operation of the motor 11 necessary to bring the valve 12 to the predetermined position selected by the control device 13, means such as the rheostat 28 may be provided for producing in conjunction with the remote control device 13 a differential voltage dependent on the direction and distance of the valve from a desired position. The rheostat 28 may comprise a movable contact arm 29 and a voltage dividing resistor 30. The contact arm may be operatively connected to the valve 12 by means of the shaft 25 and rotatable to engage any one of a plurality of spaced apart stationary contact members 30a, 30b, etc. These contact members may be connected at predetermined points to the voltage-dividing resistor 30 connected to the direct-current source and may be slightly elongated, so as to provide voltages differing by predetermined increments in accordance with the actual position of the valve 12, during at least each of the operating positions.

The remote control device 13 may likewise comprise a movable contact arm 32 and a voltage-dividing resistor 34. The arm 32 may be manually operated to a finite number of different operating positions corresponding to the different operating positions of the valve 12 for engaging a plurality of spaced contact members 34a, 34b, etc. These contact members may be connected to the voltage-dividing resistor 34 which is connected to the source of direct current, at predetermined spaced apart points corresponding to those of the stationary contact members 30a, 30b, etc.

Operation of the motor 11 may be selectively effected by means of control relays 36 and 38 which connect the field windings 14 and 15, respectively, to the source of direct current. Selective operation of the control relays 36 and 38 may be effected by means of a directional relay 40. The directional relay 40 may be of any suitable type, such as a polarized relay having a magnetic core 41 with an operating winding 42 connected between the moving contact arms 29 and 32 of the rheostats 28 and 13, respectively. The moving armature 43 of the directional relay 40 may comprise a permanent magnet member normally biased to an intermediate position by means such as the springs 44 and disposed to be actuated in one direction or the other to engage stationary contact members 40a or 40b depending on the polarity of the differential voltage existing between the contact arms 32 and 29 each time the valve 12 is in one of the finite number of operating positions.

In order to insure accurate positioning of the valve 12, means such as the switch device 45 may be provided for interrupting the operating circuit of the motor 11 each time the valve 12 is in one of the finite number of operating positions. This switch device may comprise a movable contact arm 46 for normally engaging a stationary contact member 45a to provide an operating circuit for the armature of the valve motor. Means such as the cam 47 may be provided, having a plurality of projections 47a, 47b, etc., thereon at spaced intervals corresponding to the different positions of the valve 12. The projections may be arranged to actuate the contact arm 46 to interrupt the operating circuit of the motor 11 during only a portion of the time that the valve 12 is passing through one of the finite number of operating positions and when the arm 29 is engaging one or the other of the stationary contact members 30a, 30b, etc., which have an elongated contact surface.

With the remote control device 13 in the position as shown, no voltage differential exists between the contact arms 32 and 29. Accordingly, the operating winding 42 of the directional relay 40 is deenergized, and neither of the control relays 36 and 38 is energized. The motor 11, therefore, remains at rest.

Should it be desired, for example, to move the valve 12 to the third operating position, the movable contact arm 32 of the remote control device 13 may be moved to engage its third contact member 34c. A voltage differential equal to the voltage drop across two of the steps of the resistance 34 will be produced between the contact arms 32 and 29 and the arm 29 will be at the higher voltage so that a current flows in such a direction as to energize the operating winding 42 of the directional relay 40 to cause its contact arm 43 to engage the stationary contact member 40a. An energizing circuit is thereby established for the operating winding 49 of the control relay 38, extending from conductor 17 through conductor 48, winding 49, normally closed contact members 36b, contact member 40a, armature 43 and conductor 51 to conductor 18. At the same time, an energizing circuit is established for the field winding 15 through contact members 36b, contact 40a, arm 43 and conductor 51. The operating winding 21 of the switch 20 is likewise energized and the switch operates to connect the armature 16 to the conductors 17 and 18 to start the motor 11 in a direction to move the contact arm 29 in a clockwise direction.

As soon as the contact arm 29 leaves stationary contact member 30a, the circuit hereinbefore described for the operating winding 42 of the direction relay is deenergized. However, before this occurs, the cam 47 moves from the position shown so that the switch device 45 operates to effect engagement of its contact members 46 and 45a. A holding circuit is thus provided for the control relay 38 extending from conductor 18, through contact members 45a and 46, conductor 53, contact member 38a, operating winding 49 and conductor 48 to conductor 17. The field winding 15, which is connected in parallel circuit relation with the operating winding 49, is likewise maintained energized during the interval between disengagement of the moving contact arm 29 with contact member 30a and engagement thereof with contact member 30b.

As soon as the valve 12 reaches the next one of its operating positions, the projection 47b on the cam 47 again operates the switch device 45 to interrupt the energizing circuit for the field winding 15 of the motor 11. However, slightly before this time, the moving contact arm 29 of the rheostat 28 engages contact member 30b. Since a differential voltage of the same polarity, equal to the voltage drop across one step of the resistance 34, still exists between contact arm 32 and contact arm 29, and this increment of voltage is purposely arranged to be sufficient for positive operation of the directional relay 40, the operating winding 42 of the directional relay 40 is again energized so that this relay operates to reenergize the operating winding 49 of the control relay 38. The energizing circuit for the field winding 15 of the motor 11 is thereby maintained, despite the fact that the switch device 45 opens. As soon as the valve 12 moves from the second of its finite number of operating positions, the switch device 45 again closes and provides a holding circuit for the control relay 38 and an energizing circuit for the field winding 15 of the valve motor while the contact arm 29 travels between the contacts 30b and 30c.

The motor continues to operate until the valve 12 reaches the next of its predetermined operating positions. As soon as the valve reaches this next operating position, the projection 47c of the cam 47 opens the switch device 45. Since the contact member 30c is at the same operating potential as contact 34c of the remote control device, the operating winding 42 of the directional relay 40 remains deenergized. Accordingly, opening of the switch device 45 deenergizes the field winding 15 of the valve motor as well as operating winding 49 of the control relay 38, and positively insures stoppage of the motor so that the valve 12 remains in the operating position corresponding to that selected through operation of the moving contact arm 32 of the remote control device 13. Should the contact arm 32 be now moved in a counterclockwise direction, the polarity of the voltage differential between the contact arms 32 and 29 would be reversed, so that the directional relay 40 would operate in the reverse direction to close armature 43 and contact 40b and effect energization of the control relay 36 and the field winding 14 to operate the motor in the other direction until the valve 12 reaches the position corresponding to that of the moving contact arm 32.

From the above-described construction and the accompanying drawing, it will be apparent that I have provided in a simple and effective manner for positively and definitely controlling the operation of a movable element, such as a valve or the like, from a remote location. By periodically interrupting the operating circuit of the motor driving the movable element in each of the finite number of operating positions and using a corresponding finite number of distinct increments of differential voltage to control the operation of the motor, positive operation thereof to a predetermined position without any overshoot or undershoot may be readily effected. A control system embodying the features of my invention requires a minimum of equipment and is reliable in operation and easy to maintain.

Since certain changes may be made in the above-described construction and different embodiments of the invention may be made without departing from the spirit or scope thereof, it is intended that all of the matter contained in the above description and shown in the accompanying drawing shall be considered as illustrative and not in a limiting sense.

I claim as my invention:

1. A remote control system for a moving element having a finite number of different operating positions comprising, means for producing a control voltage variable in accordance with the position of the element, means for producing an additional control voltage variable in accordance with a desired position of the element, a reversible motor having a pair of field windings and an armature operatively connected to move the element, control means having normally open contact means connected for controlling the excitation of the field windings for operating the motor in opposite directions, switch means having contact means operative intermediate said operating positions of the element connected in series circuit relation with the contact means of the control means to provide for excitation of the field windings in conjunction with the control relay means, means so connected in a Wheatstone bridge circuit with the means for producing the control voltage as to be responsive to the polarity of the differential between the control voltages for controlling the control means to selectively provide for excitation of the field windings in each of the operating positions remote from the desired one, and relay means responsive to excitation of the field windings for controlling the energization of the armature.

2. A remote control system for a valve having a finite number of distinct operating positions comprising, a reversible direct-current motor having an armature mechanically connected to the valve and energized from a source of direct current and a pair of oppositely related field windings, a rheostat having a moving contact arm mechanically operated by the armature for engaging different ones of a number of spaced stationary contact members positioned corresponding to the operating positions of the valve and connected to spaced points on a voltage divider connected across the source, a remotely located position control rheostat having a moving contact arm prepositionable to engage any one of a similar number of spaced contact members connected at similar intervals to a similar voltage divider connected to the source in shunt circuit relation with the aforesaid voltage divider, a polarized relay having an operating winding connected to said voltage divider through said moving contact arms to provide the balance circuit of a Wheatstone bridge circuit, said polarized relay being selectively responsive to the polarity of a voltage differential between said moving contacts, switch means having normally closed contact members disposed to be actuated by a cam device operatively connected to the armature of the motor and having a plurality of relatively sharply pointed cam surfaces to actuate said contact members to open them each time the valve reaches one of said operating positions and in substantially the same position regardless of the direction of movement, a pair of control relays having contact means connected in circuit with the switch means for selectively providing an energizing circuit for one or the other of the field windings under the control of the polarized relay intermediate each of the operating positions of the valve, and circuit means including contact members of the polarized relay and the control relays connected to selectively provide an energizing circuit for one or the other of the field windings in response to a differential voltage between said moving contact arms in an operating position of the valve.

SEYMOUR W. HERWALD.

REFERENCES CITED

The following references are of record in the file of this patent:

UNITED STATES PATENTS

| Number | Name | Date |
|---|---|---|
| 1,669,112 | Winter | May 8, 1928 |
| 2,177,850 | Vogt et al. | Oct. 31, 1939 |
| 2,295,355 | Prescott | Sept. 8, 1942 |
| 2,409,895 | Phelps | Oct. 22, 1946 |